S. STEVENS.
TOILET APPLIANCE.
APPLICATION FILED AUG. 21, 1920.
1,357,742. Patented Nov. 2, 1920.
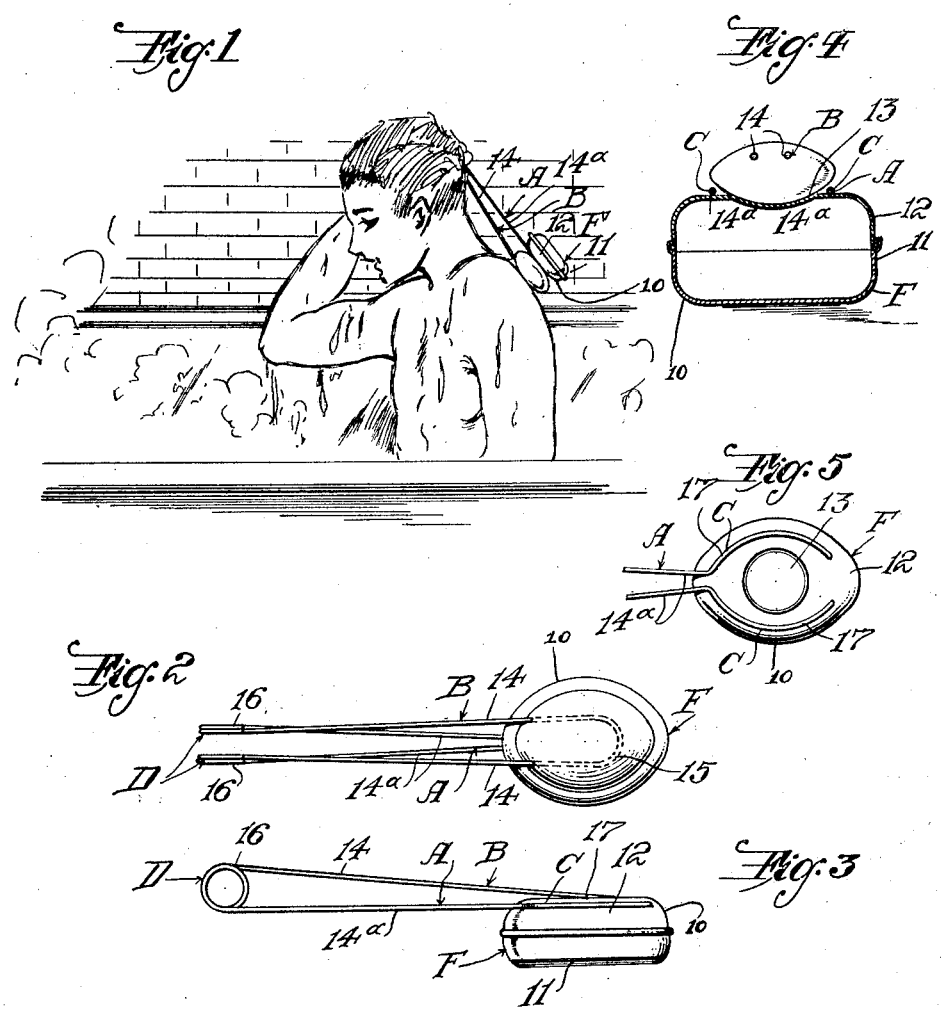

UNITED STATES PATENT OFFICE.

SIDNEY STEVENS, OF MILLINOCKET, MAINE.

TOILET APPLIANCE.

1,357,742.  Specification of Letters Patent.  Patented Nov. 2, 1920.

Application filed August 21, 1920. Serial No. 405,002.

*To all whom it may concern:*

Be it known that I, SIDNEY STEVENS, a citizen of the United States, residing at Millinocket, in the county of Penobscot and State of Maine, have invented certain new and useful Improvements in Toilet Appliances, of which the following is a specification, reference being had to the accompanying drawings.

This invention relates to a toilet appliance, and more particularly to a device adapted to provide a handle for use in holding a cake of soap, and means associated with the handle to cause the handle and cake of soap to float.

A large percentage of the soap manufactured is of the non-floating type, and is difficult to locate when desired in the bath. Furthermore, it is extremely difficult to apply soap to the back and feet while holding the cake of soap in the hand. This difficulty is further increased by the fact that the soap within the bath becomes extremely slippery and difficult to manage. I have, accordingly, devised an apparatus whereby the soap may be more readily handled for application to the remote portions of the body, and whereby the cake of soap is caused to float upon the surface of the water where it may be readily located. This invention consists, broadly, in a pair of handle members, one of which has suitably connected thereto a float. These handle members are provided with means for urging the portions of the handle members at one end thereof into engagement thereby forming a clamp adapted to receive the cake of soap and hold the same.

In the accompanying drawings wherein for the purpose of illustration is shown a preferred embodiment of my invention, wherein like reference characters designate like parts throughout:

Figure 1 is a perspective view showing my soap holder in use.

Fig. 2 is a plan view of my device in use in holding a cake of soap.

Fig. 3 is a side elevation of my device.

Fig. 4 is a sectional view illustrating the construction of the float member, and Fig. 5 is a plan view of the float member showing the manner in which the handle is attached thereto.

Referring now more particularly to the drawings: A and B designate handle portions, one of which has secured to one end thereof as at C a float, F. Between the opposite end of this handle and the corresponding end of the other handle member is disposed a spring D, which constantly urges the free end of the handle member B downwardly to engage the end of the handle member A, which is secured to the float F. It will be seen that a cake of soap placed between the arms at this point will be firmly held by the arms against slipping.

More specifically, a float F is provided formed of separable sections 11 and 12 secured together in any suitable manner, the upper section 12 having formed in its upper face a concavity or depression 13. Handle arms 14 and 14ª are provided. These arms are preferably formed by utilizing a single piece of spring wire or the like bent back upon itself as at 15. The parallel sections thus formed are provided with spring loops D intermediate their ends. The ends of the wire are slightly bowed outwardly, as at 17 and attached to the upper handle 12 of the float F at the sides of the concavity 13. The spring loops 16 are so formed that the end of the arm 14 provided with a loop 15 is constantly urged toward the float F.

In the use of my invention, the cake of soap is inserted intermediate the float and the end of the arm 14 bearing loop 15 and this end of the arm pressed into the soap sufficiently to prevent its projection above the surface thereof, in order that the soap may be readily brought into contact with the skin. The concavity formed in the upper surface of the float will receive soap having a curved face, in which form the majority of manufacturers form their cakes.

It will be obvious that my device, by reason of its simplicity and efficiency in use, is advantageous, and it will likewise be obvious that the same is capable of some structural change without departing from the spirit of my invention. I accordingly do not limit myself to the specific structure hereinbefore set forth except as so limited by the subjoined claims.

Having described my invention, what I claim is:

1. In a toilet appliance, a float provided in the upper surface thereof with a concavity, a pair of handle members, and means connecting said handle members whereby corresponding ends thereof are urged into engagement one with the other, one of said handle members being provided at the end thereof adapted to be engaged with the other of said handle members with spaced arms said arms being connected to said float upon opposite sides of said concavity.

2. In a toilet appliance, a handle member comprising a single piece of wire provided centrally with a loop bend providing parallel portions, said parallel portions being provided centrally with spring loops tending to force the free ends of the wire into engagement with said loop bend, and a float member provided in one face thereof with a concavity, said free ends being secured to said float member upon opposite sides of said concavity.

3. In a toilet appliance, a pair of handle members, a float secured to one end of one of said handle members, and means connecting the other end of said handle member with the other of said handle members whereby the free end of the last named handle member is urged into engagement with said float.

4. In a toilet appliance, a pair of handle members, a float secured to one end of one of said handle members, and means connecting the other end of said handle member with the other of said handle members whereby the free end of the last named handle member is urged into engagement with said float, said float being provided in the face thereof next adjacent said free end with a concavity.

In testimony whereof I hereunto affix my signature.

SIDNEY STEVENS.